United States Patent [19]

Van Boeckel et al.

[11] Patent Number: 5,451,668
[45] Date of Patent: Sep. 19, 1995

[54] PROCESS FOR SPLITTING OFF $\Delta^4$-UNSATURATED URONIC ACID FROM GLYCOSAMINOGLYCANS

[75] Inventors: Constant A. A. Van Boeckel; Gijsbert W. K. Van Dedem, both of Oss, Netherlands

[73] Assignee: N.V. Akzo, Arnhem, Netherlands

[21] Appl. No.: 466,161

[22] Filed: Jan. 17, 1990

[30] Foreign Application Priority Data

Jan. 19, 1989 [NL] Netherlands ............ 8900119

[51] Int. Cl.⁶ .............. C08B 37/10; C07H 1/00; C07G 3/00; A01N 43/04
[52] U.S. Cl. ................... 536/21; 536/1.11; 536/4.1; 536/123.1; 536/31; 514/56
[58] Field of Search ........... 536/21, 1.1, 123, 4.1, 536/121, 123.1, 31; 514/56; 435/269; 436/824; 424/10

[56] References Cited

U.S. PATENT DOCUMENTS

| | | | |
|---|---|---|---|
| 2,830,931 | 4/1958 | Burfoot et al. | 536/21 |
| 3,135,660 | 6/1964 | Bush et al. | 536/21 |
| 4,239,664 | 12/1980 | Teng et al. | 514/56 |
| 4,322,275 | 3/1982 | Jain | 436/824 |
| 4,446,314 | 5/1984 | Jordan | 536/1.1 |
| 4,826,827 | 5/1989 | Lormeau et al. | 536/21 |
| 4,958,016 | 9/1990 | Kerkenaar et al. | 536/123 |
| 5,039,529 | 8/1991 | Bergendal et al. | 514/56 |

FOREIGN PATENT DOCUMENTS 0244236 11/1987 European Pat. Off. .

OTHER PUBLICATIONS

Applied Biochemistry and Biotechnology, 12 (1986), pp. 135–176.

*Primary Examiner*—David A. Redding
*Assistant Examiner*—Louise N. Leary
*Attorney, Agent, or Firm*—William M. Blackstone

[57] ABSTRACT

Process for splitting off $\Delta^4$-unsaturated uronic acid from glycosaminoglycan, in which the glycosaminoglycan is treated with an iodine solution or with a bleaching reagent, or with a combination thereof.

13 Claims, No Drawings

PROCESS FOR SPLITTING OFF Δ⁴-UNSATURATED URONIC ACID FROM GLYCOSAMINOGLYCANS

The invention relates to a novel process for splitting Δ⁴-unsaturated uronic acid from glycosaminoglycans.

Glycosaminoglycans containing a Δ⁴-unsaturated uronic acid are formed with some degradation methods which are used on glycosaminoglycans. When, for example, heparin is subjected to degradation with heparin lyase, the degradation will proceed such that the glycoside bond between a glycosamine unit and a uronic acid unit is broken, a double bond between C-4 and C-5 being formed in the newly generated non-reducing end. Fragments of this type do not occur naturally and give an increased chance of immunogenic properties when used in patients. It is therefore important to remove the double bond in such a way that a natural fragment is obtained.

Processes for removing unsaturated uronic acid are known. A conventional method is to treat glycosaminoglycans containing a Δ⁴-unsaturated uronic acid with mercury(II) chloride, as described by U. Ludwigs et al. [Biochem. J. (1987), 245, 795]. This method has the disadvantage that toxic mercury compounds have to be used and that traces of mercury residues in the end product can never be avoided with certainty, so that these products are unsuitable for administration to humans.

Methods are also known in which the Δ⁴-unsaturated uronic acid is split off with the aid of enzymes, such as glucuronidases, which, for example, occur in the Flavobacterium Heparinum complex. This method has the disadvantage that not all types of glycosaminoglycans react with this type of enzymes, so that the use of this method is restricted. Furthermore, great difficulties can be encountered in removing the enzymes from the end products, and obtaining pure enzymes is a difficult and costly process.

It has now been found that treatment of glycosaminoglycans with an iodine solution or with a bleaching reagent or with a combination thereof is a simple, inexpensive, effective and non-toxic method for removing Δ⁴-unsaturated uronic acid from glycosaminoglycans, without possessing the disadvantages, described above, of the known methods.

The method to be employed consists in that a glycosaminoglycan containing a Δ⁴-unsaturated uronic acid is reacted in a suitable solvent with a solution of $I_2$. A comparable result is obtained if the glycosaminoglycan is reacted with a bleaching agent, for example with a peroxide such as hydrogen peroxide, or with a permanganate or perchlorate and the like. Bleaching reactions of this type are known per se and are described, for example, in U.S. Pat. No. 2,830,931. It can sometimes be advantageous to treat a glycosaminoglycan containing a Δ⁴-unsaturated uronic acid both with the iodine solution and with the bleaching reagent, especially if the double bond is difficult to remove. The sequence of treatment is not important in this case.

The glycosaminoglycans containing a Δ⁴-unsaturated uronic acid are obtained from the degradation of glycosaminoglycans. Glycosaminoglycans are understood to be carbohydrates which contain uronic acid-hexosamine units or a uronic acid-hexosamine unit, such as heparin, heparan sulphate, hyaluronic acid, chondroitin sulphate, dermatan sulphate, K5 antigen and the like.

The degradation can be carried out in various ways, for example by basic elimination of heparin esters, but usually the glycosaminoglycans are degraded with the aid of enzymes. Examples are heparin lyase for heparin, K5 lyase for K5 antigen, chondroitinase AC or ABC for hyaluronic acid, chondroitin sulphate and dermatan sulphate, and heparitin lyase for heparin sulphate.

Suitable solvents are all solvents in which the glycosaminoglycan or salts thereof and the iodine solution and/or the bleaching reagent dissolve. Suitable solvents are, for example, water, dimethylformamide, dimethyl sulphoxide, alcohols and mixtures thereof. Aqueous solutions, and in particular water, are preferred. If necessary, KI is added to dissolve the iodine.

In order to obtain reasonable reaction times, a weight ratio of glycosaminoglycan: $I_2$ of between 1:10 and 10:1 is used, a ratio of between 5:1 and 2:1 being preferred. The iodination reaction is carried out at a pH between 2 and 9 and preferably between 4 and 5. The weight ratio glycosaminoglycan:bleaching reagent is chosen between about 15:1 and 1:5 at a pH which is between 5 and 10 and preferably between 7,5 and 9.

The splitting off of the Δ⁴-unsaturated uronic acid can be followed well with the aid of the disappearance of the olefinic signal in the NMR spectrum and with the aid of the reduction in the UV extinction. In the NMR spectrum a signal at about $\delta$ 6,0±0,4 ppm is decisive for the presence of a double bond. In the UV spectrum the decrease in the quantity of double bond is measurable by the decrease in the extinction between 220 and 240 nm. The conditions for the iodine treatment and/or the bleaching are chosen such that the products contain less than 5% (according to NMR) of glycosaminoglycans containing a double bond. Preferably, the content of Δ⁴-unsaturated compounds determined by NMR is less than 1%.

The method described above is suitable for all types of glycosaminoglycan which contain a Δ⁴-unsaturated uronic acid. The method is specifically suitable for heparin fragments and in particular for heparin fragments obtained by heparinase degradation.

The products which are obtained in accordance with this procedure are active constituents without undesired immunogenic action for use in pharmaceutical preparations which are used in combatting, inter alia, thrombosis, angiogenesis, cancer, AIDS and diseases of the immune system. Preparations of this type are suitable for enteral and parenteral administration, for example in the form of a tablet, pill, suppository, injection, infusion and the like.

The invention is illustrated in more detail by the following examples.

EXAMPLE 1

Heparin Degradation with Heparin Lyase 200 g of heparin are dissolved in 10 l of buffer (0,25M ammonium acetate, 0,0025M calcium acetate, pH=5,5). 2000 units of heparin lyase are added to this solution. After the desired mean molecular weight has been reached, the reaction is stopped by heating the solution to 100° C. and keeping it at 100° C. for 10 minutes. The heparin is then precipitated with 5% (w/w) NaCl and 80% (v/v) methanol. The heparin fragment thus obtained has a double bond (of 4,5-unsaturated uronic acid).

b. Iodine Treatment of Heparin Fragments

Heparin degraded with heparin lyase is dissolved in distilled water (10 mg/ml). This solution is mixed 1:1 with iodine solution (5 mg/ml KI, 3 mg/ml $I_2$). The pH is adjusted to 4,5 with 0,1N HCl. The pH is then kept at 4,5 with 0,1N NaOH for about 6 hours. The mixture is allowed to react to completion overnight. Thereafter the same precipitation takes place as described above.

c. Bleaching 1,5 g of the heparin fragment obtained from b. is dissolved in 20 ml of distilled water and filtered through a bed of kieselguhr and rinsed with distilled water. The aqueous solution collected (30 ml) is rapidly heated to 80° C. and the pH is adjusted to between 8,0 and 8,5. 0,5 ml of a sodium permanganate solution (40%, w/v) is added to the hot solution, after which the solution is kept at 80° C. for 30 min. The solution is then cooled to 40° C. The manganese dioxide formed is removed by filtering through a 0,45 μm filter and the filtrate is brought to pH 6,5. The product is precipitated in the manner described above. In the NMR spectrum the absorption at δ 6,0 is <1% of the absorption before treatment (internal standard absorption δ 2,0, N-acetyl).

EXAMPLE 2

The enzymatically degraded heparin (100 mg) obtained according to example 1a. is dissolved in 10 ml of distilled water and the solution is mixed with 10 ml of KI/$I_2$ solution (10 ml of a 0,033M KI solution which contains 0,012M $I_2$). The pH is brought to 4,5 and kept at this value with 0,1N NaOH. After 20 hours the mixture is diluted four-fold with water and purified over a QAE-Zetaprep cartridge (100 ml bed volume). The adsorbent is washed with water and eluted with 3M NaCl. Finally, the preparation is precipitated with 75% methanol. In the NMR spectrum the peak at δ 6,0 has completely disappeared.

EXAMPLE 3

The enzymatically degraded heparin (500 mg) obtained in accordance with example 1a. is dissolved in 7 ml of distilled water and filtered through a 0,45 μm filter, which is rinsed with 3 ml of distilled water. The solution is rapidly heated to 80° C. and the pH is brought to pH 8,5 with 1N NaOH, after which 0,2 ml of a 40% (w/w) sodium permanganate solution is added. The solution is kept at 80° C. and the pH at about 8,5 for 30 min, after which the solution is cooled to 40° C. and the $MnO_2$ formed is filtered off over a 0,45 μm filter. The pH is brought to 6,5 and the bleached heparin fragment is precipitated by adding 4% (w/w) NaCl and 80% methanol. In the NMR spectrum the peak at δ 6,0 has disappeared.

EXAMPLE 4

In a manner analogous to that described in Example 1b, a tetrasaccharide (50 mg) obtained from heparin was incubated with 60 μmol of $I_2$ and 120 μmol of KI in a total volume of 20 ml. After 65 hours at pH 4,5, the mixture was desalted on a Sephadex G-10 column and then freeze-dried. In the NMR spectrum the peak at δ 6,0 has disappeared.

EXAMPLE 5

In a manner analogous to that described in example 4, 49,9 mg of tetrasaccharide obtained from E. coli K5 were treated with 60 μmol of $I_2$ and 120 μmol of KI. In the NMR spectrum the peak at δ 5,7 has completely disappeared.

EXAMPLE 6

Dermatan sulphate (7 mg) degraded with chondroitinase ABC was dissolved in 1 ml of distilled water and, in a manner analogous to that in Example 1, treated with 1 ml of an iodine solution (5 mg/ml of KI and 3 mg/ml of $I_2$) and bleached. In the NMR spectrum the peak at δ 6,0 has completely disappeared.

We claim:

1. A method for splitting off delta[4]-unsaturated uronic acid from glycosaminoglycan degradation products, consisting essentially of degrading a glycosaminoglycan with an enzyme thereby forming a glycosaminoglycan degradation fragment containing a delta[4]-unsaturated uronic acid, reacting said fragment, until the NMR peak at delta 6.0 has disappeared, with a reagent selected from the group consisting of an iodine solution, peroxides, permanganates, perchlorates and a combination thereof, wherein the weight ratio of said glycosaminoglycan fragment:I2 is from 1:10 to 10:1 and the weight ratio of said glycosaminoglycan fragment:peroxide, permaganate or perchlorate is from 15:1 to 1:5, thereby obtaining a glycosaminoglycan fragment without a delta[4]-unsaturated uronic acid.

2. A method according to claim 1, wherein the reagent is an iodine solution.

3. A method according to claim 1, wherein the reagent is a bleaching agent selected from the group consisting of peroxidaes, permaganate and perchlorate.

4. A method according to claim 2, comprising an additional step of reacting the glycosaminoglycan fragment with a bleaching reagent selected from the group consisting of peroxides, permaganate and perchlorate.

5. A method according to claim 1, wherein the glycosaminoglycan degradation fragment is a heparin fragment containing a delta[4]-unsaturated uronic acid.

6. A method according to claim 5, wherein the enzyme is heparin lyase.

7. A method according to claim 3, comprising an additional step of treating the glycosaminoglycan fragment with an iodine solution.

8. A method according to claim 2, wherein the glycosaminoglycan degradation fragment is a heparin fragment containing a delta[4]-unsaturated uronic acid.

9. A method according to claim 2, wherein the glycosaminoglycan degradation product is a heparin fragment obtained by heparin lyase degradation.

10. A method according to claim 3, wherein the glycosaminoglycan degradation fragment is a heparin fragment containing a delta[4]-unsaturated uronic acid.

11. A method according to claim 3, wherein the glycosaminoglycan degradation fragment is a heparin fragment obtained by heparin lyase degradation.

12. A method according to claim 4, wherein the glycosaminoglycan degradation fragment is a heparin fragment containing a delta[4]-unsaturated uronic acid.

13. A method according to claim 4, wherein the glycosaminoglycan degradation fragment is a heparin fragment obtained by heparin lyase degradation.

* * * * *

UNITED STATES PATENT AND TRADEMARK OFFICE
CERTIFICATE OF CORRECTION

PATENT NO. : 5,451,668
DATED : September 19, 1995
INVENTOR(S) : Constant A.A. van Boeckel and Gijsbert W.K. van Dedem It is certified that error appears in the above-indentified patent and that said Letters Patent is hereby corrected as shown below:

On the title page, item

"[73] Assignee:" by deleting "N.V. Akzo" and replacing with

-- Akzo N.V. --.

Signed and Sealed this

Twelfth Day of December, 1995

Attest:

BRUCE LEHMAN

Attesting Officer

Commissioner of Patents and Trademarks